(12) United States Patent
Wang et al.

(10) Patent No.: US 7,923,478 B2
(45) Date of Patent: Apr. 12, 2011

(54) NANOPOROUS POLYMERIC MATERIAL AND PREPARATION METHOD

(75) Inventors: Xiaorong Wang, Hudson, OH (US); Mindaugas Rackaitis, Massillon, OH (US)

(73) Assignee: Bridgestone Corporation, Tokyo (JP)

( * ) Notice: Subject to any disclaimer, the term of this patent is extended or adjusted under 35 U.S.C. 154(b) by 539 days.

(21) Appl. No.: 11/954,268

(22) Filed: Dec. 12, 2007

(65) Prior Publication Data

US 2008/0188579 A1 Aug. 7, 2008

Related U.S. Application Data

(60) Provisional application No. 60/877,641, filed on Dec. 28, 2006.

(51) Int. Cl.
*C08J 9/00* (2006.01)
*C08J 9/24* (2006.01)
*C08F 110/00* (2006.01)
*C08F 210/00* (2006.01)
*B32B 3/26* (2006.01)
*B32B 27/00* (2006.01)

(52) U.S. Cl. ......... 521/64; 521/84.1; 521/142; 521/143; 521/144; 521/147; 521/149; 428/304.4; 428/319.3

(58) Field of Classification Search ............ 521/146, 521/64, 84.1, 142, 143, 144, 147, 149; 428/304.4, 428/319.3
See application file for complete search history.

(56) References Cited

U.S. PATENT DOCUMENTS

| | | | |
|---|---|---|---|
| 4,867,881 A * | 9/1989 | Kinzer | 210/490 |
| 6,380,347 B1 | 4/2002 | Lau et al. | |
| 6,562,449 B2 | 5/2003 | Drage | |
| 6,805,972 B2 | 10/2004 | Erlebacher et al. | |
| 6,825,260 B2 | 11/2004 | Sievers et al. | |
| 6,875,442 B2 | 4/2005 | Holy et al. | |
| 7,238,751 B2 | 7/2007 | Wang et al. | |
| 7,306,754 B2 * | 12/2007 | Krause et al. | 264/51 |
| 2005/0197462 A1 * | 9/2005 | Wang et al. | 525/313 |

(Continued)

FOREIGN PATENT DOCUMENTS

FR 2099645 3/1972

OTHER PUBLICATIONS

Caneba, Gerard T. et al., "Polymer Membrane Formation through the Thermal-Inversion Process. 1. Experimental Study of Membrane Structure Formation", Macromolecules, vol. 18, No. 12, pp. 2538-2545 (1985).

(Continued)

*Primary Examiner* — Randy Gulakowski
*Assistant Examiner* — Kara Negrelli
(74) *Attorney, Agent, or Firm* — Meredith E. Hooker; Nathan T. Lewis

(57) ABSTRACT

A nanoporous material is provided. The pores of the nanoporous material are formed between nanoparticles that have a polymeric surface layer. The nanoporous material is produced by (a) suspending the nanoparticles in a medium material, wherein the nanoparticles are phase separated from the medium material, (b) heating the suspension to a temperature above the melting point of the nanoparticle surface layer, and (c) cooling the suspension. Alternatively, the nanoporous material may be produced by dissolving nanoparticles having a polymeric surface layer in a solvent, and then adding a medium material that causes the nanoparticles to phase separate from the solution.

15 Claims, 4 Drawing Sheets

U.S. PATENT DOCUMENTS

2006/0065583 A1* 3/2006 Buckley et al. ............ 210/198.2
2008/0038359 A1* 2/2008 Abu-Izza .................... 424/489

OTHER PUBLICATIONS

Laxminarayan, Anand et al., "Effect of initial composition, phase separation temperature and polymer crystallization on the formation of microcellular structures via thermally induced phase separation", Polymer, vol. 35, No. 14, pp. 3060-3067 (1994).

Megelski, Silke et al., "Micro- and Nanostructured Surface Morphology on Electrospun Polymer Fibers", Macromolecules, vol. 35, No. 22, pp. 8456-8466 (2002).

Stratford, K. et al., "Colloidal Jamming at Interfaces: A Route to Fluid-Bicontinuous Gels", Science, vol. 309, pp. 2198-2201 and 9 pp. (Sep. 30, 2005).

Ishizu, Koji et al., "Core-Shell Type Polymer Microspheres Prepared by Domain Fixing of Block Copolymer Films", Journal of Polymer Science: Part A: Polymer Chemistry, vol. 27, pp. 3721-3731 (1989).

Ishizu, Koji et al., "Preparation of core-shell type polymer microspheres from anionic block copolymers", Polymer, vol. 34, No. 18, pp. 3929-3933 (1993).

O'Reilly, Rachel K. et al., "Functionalization of Micelles and Shell Cross-linked Nanoparticles Using Click Chemistry", Chem. Mater., vol. 17, No. 24, pp. 5976-5988 [Nov. 24, 2005].

Saito, Reiko et al., "Core-Shell Type Polymer Microspheres Prepared From Poly(Styrene-b-Methacrylic Acid)—1. Synthesis of Microgel", Eur. Polym. J., vol. 27, No. 10, pp. 1153-1159 (1991).

Saito, Reiko et al., "Arm-number effect of core-shell type polymer microsphere: 1. Control of arm-number of microsphere", Polymer, vol. 35, No. 4, pp. 866-871 (1994).

* cited by examiner

NANOPOROUS POLYMERIC MATERIAL AND PREPARATION METHOD

CROSS-REFERENCE TO RELATED APPLICATIONS

This application claims the benefit of priority from U.S. Provisional Application No. 60/877,641, filed on Dec. 28, 2006. This prior application, including the entire written description and drawing figures, is hereby incorporated into the present application by reference.

FIELD OF DISCLOSURE

The disclosure relates to nanoporous material, a method for its preparation, and its use.

BACKGROUND

There are various methods of making micro and nanoporous materials from polymers. One method of making porous material is the Thermally Induced Phase Separation (TIPS) method. The general procedure for the TIPS process comprises the steps of: (1) forming a homogenous solution by melt blending the polymer with a high-boiling point, low molecular weight liquid or solid referred to as the diluent; (2) casting or extruding the solution into the desired shape; (3) cooling the solution to induce phase separation and solidification of polymer; (4) removing the diluent (most often by solvent extraction); and (5) evaporating the extractant to yield a porous structure. However, the TIPS method produces a very small fraction of nanopores, as most of the pores produced are micropores.

There remains a need to form nanoporous materials based on an organic material using a simple technique, such that few or no micropores are produced.

SUMMARY

A method of preparing a nanoporous material is provided. The method comprises: (a) preparing a suspension of nanoparticles having polymeric surfaces in a medium material, wherein said nanoparticles are phase separated from said medium material; (b) heating the suspension prepared in step (a) to a temperature above the melting point of said polymeric surfaces of said nanoparticles; and (c) cooling the resulting product of step (b) below the melting point of said polymeric surfaces of said nanoparticles.

Another method of preparing a nanoporous material is also provided. The method comprises: (a) preparing a solution comprising (i) nanoparticles with polymeric surfaces, and (ii) a solvent in which said nanoparticles are soluble; and (b) adding a medium material that causes the nanoparticles to phase separate from the resulting solution formed in step (a).

Also provided is a nanoporous material. The nanoporous material comprises nanoparticles with polymeric surfaces, wherein the polymeric surfaces are co-crystallized, entangled, or both.

DETAILED DESCRIPTION

Figure 1:
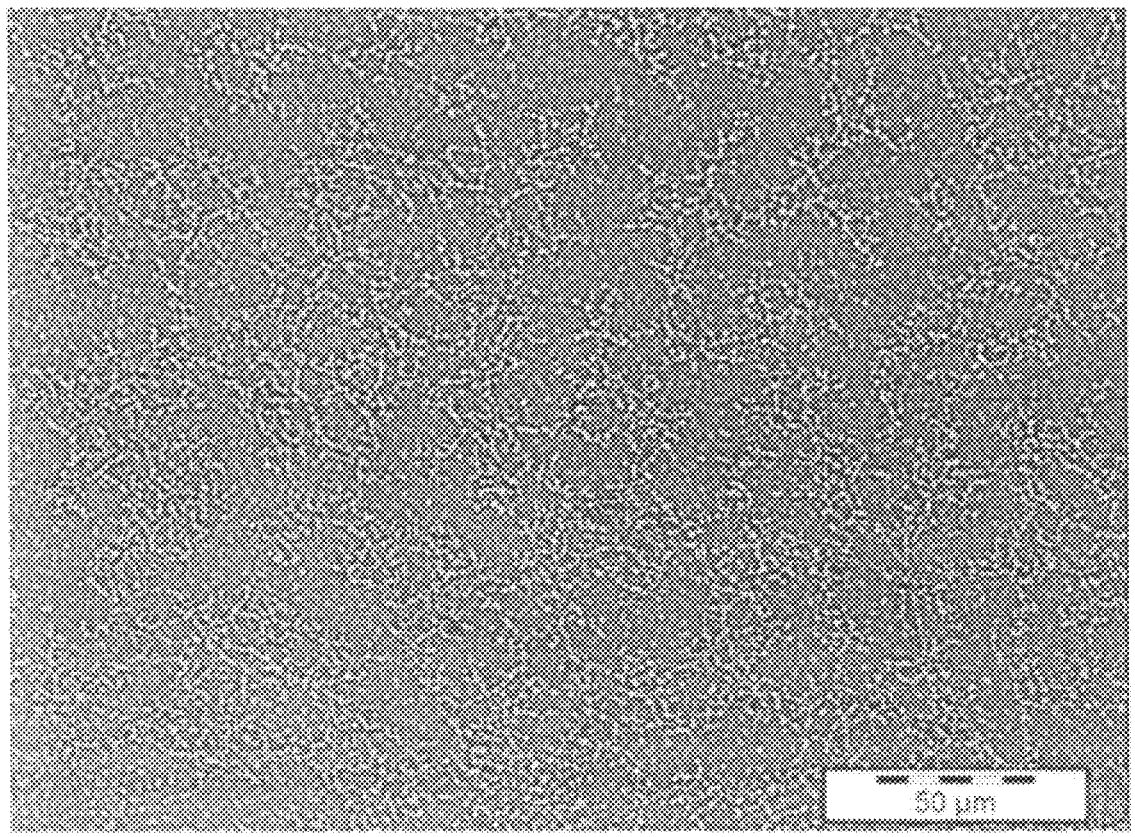
FIG. 1 is a light optical microscopy image of the nanoporous material of the present invention after quenching but before being separated from the suspension medium.
Figure 2:
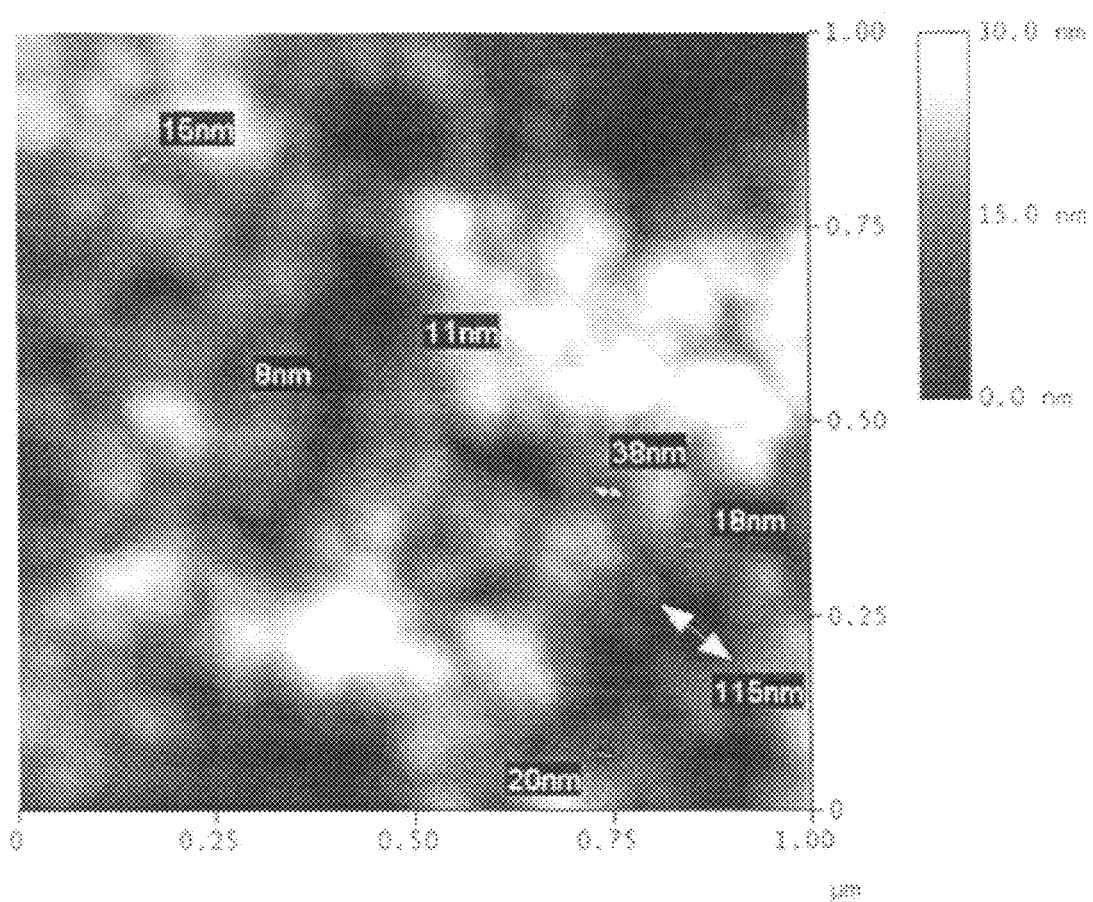
FIG. 2 is an atomic force microscopy ("AFM") topography image of the dry nanoporous material of the present invention. The dark area represents the pores.
Figure 3:
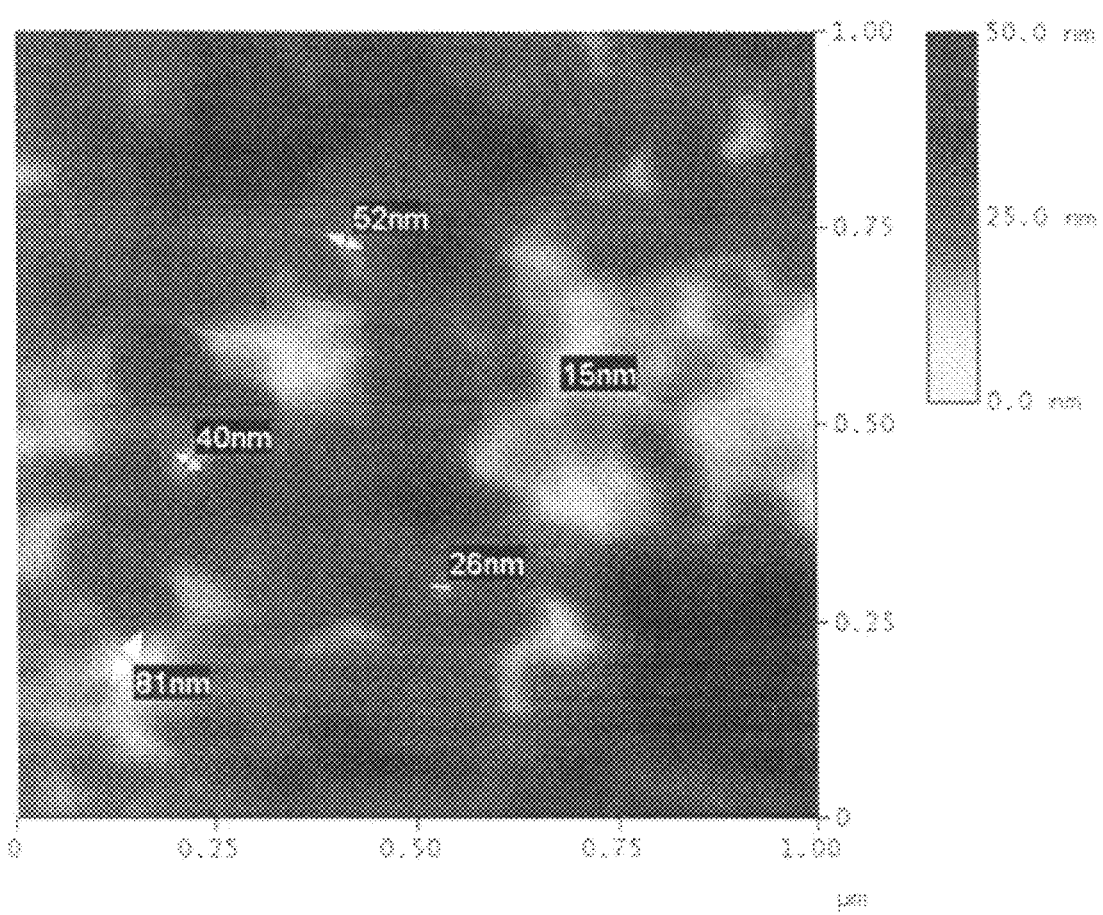
FIG. 3 is an inverted color AFM topography image of the dry nanoporous material of the present invention. The light area represents the pores.
Figure 4:
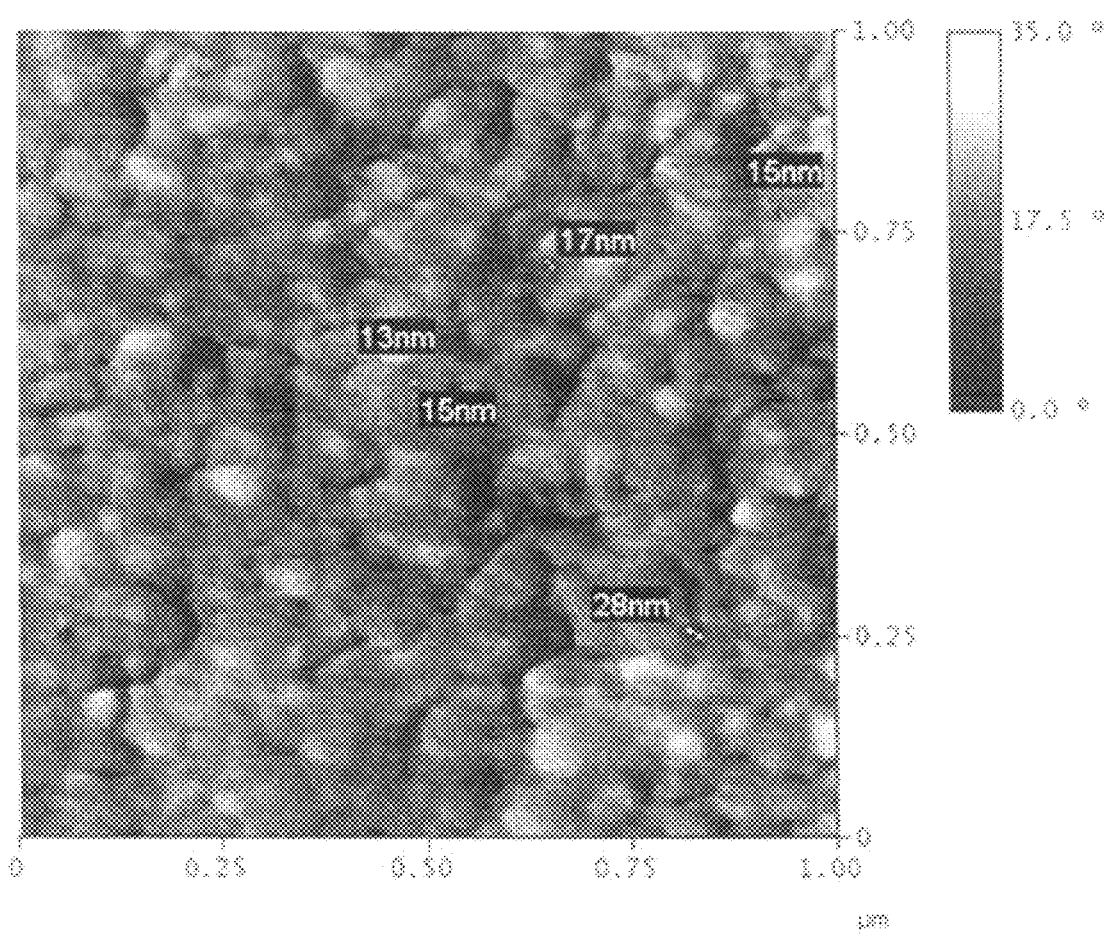
FIG. 4 is an AFM phase contrast image of the dry nanoporous material of the present invention.

In a first embodiment, nanoparticles having polymeric surfaces are suspended in a medium material. Nanoparticles having polymeric surfaces may be formed by any method. Exemplary methods for producing suitable nanoparticles are described in U.S. Pat. Nos. 6,437,050, 6,777,500, 6,872,785, 6,956,084, and 7,071,246, all of which are hereby incorporated by reference in their entirety. The mean diameter of the nanoparticles may be within the range of from about 5 nm to about 200 nm, or from about 5 nm to about 100 nm, or from about 10 nm to about 80 nm, or from about 15 nm to about 60 nm.

The nanoparticles having polymeric surfaces may have a core and shell structure. Exemplary nanoparticles having a core and shell structure are described in U.S. Pat. Nos. 6,437,050, 6,777,500, 6,872,785, 6,956,084, and 7,071,246.

If the nanoparticles have a core and shell structure, the core of the nanoparticles may comprise poly(alkenylbenzenze) monomer units, conjugated diene monomer units, or both. Suitable alkenylbenzene monomers include, but are not limited to, styrene, α-methylstyrene, 1-vinyl naphthalene, 2-vinyl naphthalene, vinyl toluene, methoxystyrene, t-butoxystyrene, and the like, as well as alkyl, cycloalkyl, aryl, alkaryl, and aralkyl derivatives thereof, in which the total number of carbon atoms in the combined hydrocarbon is generally not greater than 18, as well as any di- or tri-vinyl substituted aromatic hydrocarbons. Suitable conjugated diene units include 1,3-butadiene, 2,3-dimethyl-1,3-butadiene, isoprene, methacrylate, methyl methacrylate, vinylchloride, and acrylonitrile.

The core can optionally be cross-linked using a cross-linking monomer. Exemplary cross-linking monomers include, but are not limited to, divinyl benzene, diisopropenylbenzene, divinylether, triallyl cyanurate, triallyl isocyanurate, 1,2-polybutadiene, ethyleneglycol dimethacrylate, propyleneglycol dimethacrylate, 1,4-butanediol dimethacrylate, 1,6-hexanediol dimethacrylate, trimethylolpropane dimethacrylate, or trimethylolpropane trimethacrylate. The cross-linking monomer may be present in an amount of from 0% to about 50%, or from about 15% to about 30%, by weight based upon the weight of the polymer. Cross-linking the core can increase the hardness of the core, as well as enhance the uniformity and permanence of the shape and size of the resultant nanoparticle.

If the nanoparticles have a core and shell structure, the shell may comprise a polyolefin. The polyolefin shell can be formed by hydrogenating nanoparticles having a poly(conjugated diene) shell. Hydrogenation of a nanoparticle comprising a poly(conjugated diene) shell is taught in U.S. Pat. No. 6,689,469, which is hereby incorporated by reference in its entirety.

Optionally, the polymeric surfaces of the nanoparticles may be polar. Such polar surfaces can be produced by functional initiation during synthesis of the nanoparticles. Exemplary functional initiators include, but are not limited to, amines, sulfur and tin.

Optionally, the polymeric surface layer of the nanoparticles may be biocompatible if the nanoporous material will be utilized in medical applications, such as, for example, a kidney dialysis membrane. If a biocompatible polymeric surface layer is desired, a biocompatible polymer is used in the synthesis of the nanoparticles. Exemplary biocompatible polymeric surface layers include, but are not limited to, polyethylene oxide, poly(ethylene-covinyl acetate), silicone rubber cross-linked to poly (dimethyl siloxan sulfoxide), poly (ethylene glycol), poly(vinyl alcohol), poly(caprolactone), poly(D,L-lactic-co-glycolic acid), and mixtures thereof.

In one embodiment, a suspension of nanoparticles having polymeric surfaces in a medium material is formed, wherein the nanoparticles are phase separated from the medium material. The medium material can be an oil or low molecular weight substance. Exemplary medium materials include, but are not limited to, softeners, plasticizers, tackifiers, oligomers, lubricants, and other low molecular weight materials.

Suitable softeners include mineral oils, vegetable oils and synthetic softeners for use in rubbers and resins. Exemplary mineral oils include aromatic, naphthenic, and paraffinic process oils. Exemplary vegetable oils include castor oil, cottonseed oil, linseed oil, rape oil, soybean oil, palm oil, coconut oil, peanut oil, haze tallow, pine oil, and olive oil.

Suitable plasticizers include ester plasticizers such as phthalates, phthalic mixed esters, aliphatic dibasic acid esters, glycol esters, fatty acid esters, phosphates, and stearates; epoxy plasticizers; other plasticizers for plastics; and plasticizers for NBR such as phthalates, adipates, sebacates, phosphates, polyethers, and polyesters.

Suitable tackifiers include coumarone resins, coumarone-indene resins, phenol terpene resins, petroleum hydrocarbons, and rosin derivatives.

Suitable oligomers include crown ether, fluorinated oligomers, polyisobutylene, xylene resin, chlorinated rubber, polyethylene wax, petroleum resin, rosin ester rubber, polyalkylene glycol diacrylates, liquid rubbers (e.g., polybutadiene, styrene-butadiene rubber, butadiene-acrylonitrile rubber, and polychloroprene), silicone oligomers, and poly-a.-olefins.

Suitable lubricants include hydrocarbon lubricants such as paraffin and wax; fatty acid lubricants such as higher fatty acids and oxyfatty acids; fatty acid amide lubricants such as fatty acid amides- and alkylene bisfatty acid amides; ester lubricants such as fatty acid lower alcohol esters, fatty acid polyhydric alcohol esters and fatty acid polyglycol esters; alcohol lubricants such as aliphatic alcohols, polyhydric alcohols, polyglycols, and polyglycerols; metal soaps; and mixtures thereof.

Other useful low molecular weight materials that could be used as the medium material include inorganic silicon oil, animal oils such as beef tallow, lard, horse tallow, chicken oil and fish oil; various other materials such as petroleum, water and aqueous solutions. These materials may be used alone or in combination.

If desired, fillers may be further blended into the medium material. Exemplary fillers include flake inorganic fillers such as clay, diatomaceous earth, carbon black, silica, talc barium sulfate, calcium carbonate, magnesium carbonate, metal oxides, mica, graphite, and aluminum hydroxide; natural or synthetic short or long fibers (e.g., carbon nanotubes, other nanotubes, metal nanofibers, and polymer nanofibers).

The suspension is then heated to a temperature above the melting point of the polymeric surfaces of the nanoparticles. Subsequently, the suspension is cooled below the melting point of the polymeric surfaces. Optionally, if the melting point of the polymeric surface is above room temperature (approximately 23° C.), the suspension may be cooled to room temperature. The suspension may be cooled at a rate between about 1° C. and 200° C. per minute, or between about 5° C. and 100° C. per minute, or between about 5° C. and 20° C. per minute.

Without being bound to any particular theory, upon cooling the suspension to a temperature below the melting point of the polymeric surfaces, the nanoparticles become physically bound together by entanglement of the polymeric surface layers and/or co-crystallization of the polymeric surface layers. As a result, the voids between the physically bound nanoparticles create nanopores.

After cooling the suspension, the medium material may be removed by any conventional method. For example, the nanoporous material may be filtered from the medium material and dried, or the medium material may be extracted from the nanoporous material. The mean diameter of the pores of the dried nanoporous material may be between about 5 nm and about 500 nm, or about 5 nm and about 100 nm, or about 5 nm and about 50 nm.

Optionally, a protein may be added to the nanoporous material. A protein may be incorporated into the nanoporous material by adding the protein into the suspension of nanoparticles in the medium material. Alternatively, a protein may be incorporated during the cooling stage. Additionally, the protein may be incorporated after cooling the solution but before removal of the medium material.

If a nanoporous material with varying pore size is desired, nanoparticles of different diameters may be used. When nanoparticles of different sizes are mixed with the medium material, heated and subsequently cooled, the larger nanoparticles will phase separate from the medium material before the smaller nanoparticles. This will create a nanoporous material having larger pores at one side of the material and smaller pores at the opposite side. If a larger variety of pore sizes is desired, nanoparticles of a variety of sizes may be used to form the nanoporous material.

In another embodiment, a nanoporous material may be prepared by creating a solution by dissolving nanoparticles with polymeric surfaces in a solvent. Subsequently, a medium material is added, causing the nanoparticles to phase separate from the solution. The amount of medium material needed is the amount necessary to cause the nanoparticles to phase separate from the solution.

Suitable solvents include those that will dissolve the nanoparticles, which will be determined on a case-by-case basis depending on the composition of the nanoparticles. Exemplary solvents may include, but are not limited to, aliphatic hydrocarbons, such as pentane, hexane, heptane, octane, nonane, decane, and the like; alicyclic hydrocarbons, such as cyclohexane, methyl cyclopentane, cyclooctane, cyclopentane, cycloheptane, cyclononane, cyclodecane, and the like; toluene, xylene and tetrahydrofuran. These solvents may be used individually or in combination.

Suitable medium materials are described above.

Without being bound to any particular theory, upon phase separation, the surface layers of the nanoparticles become entangled, causing them to be physically bound together. As a result, the voids between the physically bound nanoparticles create nanopores. Varying the rate at which the medium material is added can change the mean diameter of the nanopores. Generally speaking, the faster the rate the medium material is added, the larger the pore sizes will be.

After forming the nanoporous material, the solvent and the medium material may be removed by any conventional method. For example, the nanoporous material may be filtered and dried, or the solvent and medium material may be extracted from the nanoporous material. The mean diameter of the pores of the dried nanoporous material may be between about 5 nm and about 500 nm, or about 5 nm and about 100 nm, or about 5 nm and about 50 nm.

The material formed typically has a pore size ranging from about 5 nanometers to about 500 nanometers. The pore size is preferably less than about 100 nanometers, and even more preferably less than about 50 nanometers.

The thermal and chemical stability of the nanoporous material produced by any of the above methods may be enhanced by cross-linking the polymeric surface layers of the nanoparticles, such that cross-links are formed between the surface layers of the nanoparticles. Cross-linking may be accomplished by any conventional method, including the use of sulfur, peroxides, or radiation.

The present invention will now be described with reference to non-limiting examples. The following examples are presented for purposes of illustration only and are not intended to be limiting.

EXAMPLE 1

Preparation of Nanoparticles

A reactor was charged with 1.18 pounds of hexane and 2.28 pounds of butadiene monomer. The reactor jacket temperature was set to 135° F. After allowing the temperature of the mixture to stabilize, 5.0 ml of butyl-lithium was charged to the reactor. After 2 hours, 1.5 pounds of styrene was added to the reactor. Two hours after adding the styrene, 4 pounds of hexane was slowly added to ensure good mixing conditions. Twenty minutes later, 50 ml of divinyl-benzene was charged to the reactor. Two hours after adding the divinyl-benzene, the contents of the reactor were then dropped into a mixture of acetone, isopropanol, and butylated hydroxytoluene (BHT). The resulting nanoparticles were dried using a drum dryer. The resulting nanoparticles comprised a polystyrene core and a polybutadiene surface. After drying, 160 g of the nanoparticles were dissolved into 16400 ml of hexane to form a 10 wt % solution in a reactor. Sixty (60) milliliters of a hydrogenation catalyst was then added to the solution. The reactor pressure was set to −7 psi to subject the solution to a vacuum. The reactor was then charged and vented with nitrogen five times, and subsequently charged and vented with hydrogen five times. The hydrogen pressure in the reactor was then set to 100 psi, and the reactor temperature was set to 250° F. After the reactor temperature stabilized, the hydrogen pressure was regulated to be between 300 psi and 330 psi. After seven hours and twenty minutes, the hydrogen was vented from the reactor. The reactor was then charged and vented with nitrogen five times. The nanoparticles were then dropped from the reactor into a mixture of isopropanol and a small amount of HCl. The nanoparticles were then removed from the isopropanol and washed with water. The nanoparticles were soaked in water for several days. The nanoparticles were then dried. Analysis by GPC showed the nanoparticles comprised a polystyrene core with a weight average molecular weight (Mw) of 25,000 and a hydrogenated polybutadiene surface with a Mw of 25,000. Hydrogenation of the polybutadiene surface effectively converted the polybutadiene surface into polyethylene.

EXAMPLE 2

Preparation of Nanoporous Material

The nanoparticles containing a polystyrene core and a polyethylene surface prepared in Example 1 were dispersed into diisodecyl adipate oil to make an 8 wt % suspension. The suspension was heated to slightly higher than 150° C., which is above the melting point polyethylene. The solution was then cooled to room temperature at a rate higher than 10° C. per minute. The material was then washed with hexane to remove the oil and then dried. Gravimetric measurements of the material showed a density that was approximately 61% of polyethylene's density, indicating that the porosity of the material was around 40%. The dried material was also approximately 500% smaller in volume in comparison to the volume of the same material in the hexane or oil, which is indicative of the material being highly absorbent.

EXAMPLE 3

Preparation of Nanoporous Material

The same procedure was used as in Example 2, except that the nanoparticles made in Example 1 were dispersed into diisodecyl adipate oil to make a 16 wt % suspension.

An exemplary embodiment has been described. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method of preparing a nanoporous material, comprising:
   a) preparing a suspension of nanoparticles having polymeric surfaces in a medium material, wherein said nanoparticles are phase separated from said medium material;
   b) heating the suspension prepared in step (a) to a temperature above the melting point of said polymeric surfaces of said nanoparticles; and
   c) cooling the resulting product of step (b) below the melting point of said polymeric surfaces of said nanoparticles.

2. The method of claim 1, further comprising removing the medium material from the nanoporous material obtained in step (c).

3. The method of claim 1, wherein said nanoparticles have a core and shell structure.

4. The method of claim 3, wherein said core comprises alkenylbenzene monomer units.

5. The method of claim 4, wherein said alkenylbenzene is selected from the group consisting of styrene, α-methylstyrene, 1-vinyl naphthalene, 2-vinyl naphthalene, vinyl toluene, methoxystyrene, t-butoxystyrene; any alkyl, cycloalkyl, aryl, alkaryl, and aralkyl containing derivatives in which the total number of carbon atoms in which the total number of hydrocarbon is generally not greater than 18; and any di- or tri-vinyl substituted aromatic hydrocarbons; and mixtures thereof.

6. The method of claim 3, wherein said shell comprises a polyolefin.

7. The method of claim 6, wherein said polyolefin is formed by hydrogenating nanoparticles having poly(conjugated diene) surface layers.

8. The method of claim 1, wherein said polymeric surfaces comprise a polar material.

9. The method of claim 1, further comprising adding a protein.

10. The method of claim 1, wherein said polymeric surfaces comprise a biocompatible polymer.

11. The method of claim 10, wherein the biocompatible polymer is selected from the group consisting of polyethylene oxide, poly(ethylene-covinyl acetate), silicone rubber cross-linked to poly (dimethyl siloxan sulfoxide), poly(ethylene glycol), poly(vinyl alcohol), poly(caprolactone), poly(D,L-lactic-co-glycolic acid), and mixtures thereof.

12. The method of claim 1, wherein a product of step (b) is cooled at a rate of approximately 1-200° C. per minute.

13. The method of claim 1, wherein a product of step (b) is cooled to a temperature of approximately 23° C.

14. The method of claim 1, wherein said nanoparticles comprise at least two different particle diameters.

15. The method of claim 1, wherein the medium material comprises an oil.

* * * * *